(12) United States Patent
Dutta (10) Patent No.: US 8,817,648 B2
(45) Date of Patent: Aug. 26, 2014

(54) PSEUDOWIRE EXTENDED GROUP MESSAGING IN A PACKET SWITCHED NETWORK

(75) Inventor: Pranjal K. Dutta, Sunnyvale, CA (US)

(73) Assignee: Alcatel Lucent, Boulogne-Billancourt (FR)

(*) Notice: Subject to any disclaimer, the term of this patent is extended or adjusted under 35 U.S.C. 154(b) by 63 days.

(21) Appl. No.: 13/435,904

(22) Filed: Mar. 30, 2012

(65) Prior Publication Data
US 2013/0258871 A1    Oct. 3, 2013

(51) Int. Cl.
*H04L 1/00*    (2006.01)
*H04L 12/26*   (2006.01)

(52) U.S. Cl.
USPC .......................................... 370/252; 370/253

(58) Field of Classification Search
CPC ....... H04W 24/00; H04L 43/50; H04L 43/08; H04B 17/003
USPC ......................................... 370/247, 252, 253
See application file for complete search history.

(56) References Cited

U.S. PATENT DOCUMENTS

| | | | |
|---|---|---|---|
| 2008/0291921 A1* | 11/2008 | Du et al. ................... | 370/395.53 |
| 2009/0327797 A1* | 12/2009 | Wei .................................... | 714/2 |
| 2012/0147737 A1* | 6/2012 | Taylor et al. .................. | 370/219 |

OTHER PUBLICATIONS

L. Martini et al., Pseudowire Setup and Maintenance Using the Label Distribution Protocol. Network Working Group, Request for Comments: 4447, Tellabs, Apr. 2006, The Internet Society (2006).*
M. Lasserre et al, Virutal Private LAN Service (VPLS) Using Label Distribution Protocol (LDP) Signaling. Network Working Group. Request for Comments: 4762, Alcatel-Lucent Jan. 2007. The Internet Society (2007).*
L. Martini et al., Pseudowire Setup and Maintenance Using the Label Distribution Protocol. Network Working Group. Request for Comments: 4447. Tellabs. Apr. 2006. The Internet Society (2006).
M. Lasserre et al., Virtual Private LAN Service (VPLS) Using Label Distribution Protocol (LDP) Signaling. Network Working Group. Request for Comments: 4762 Alcatel-Lucent. Jan. 2007. The Internet Society (2007).
L. Andersson et al., LDP Specification. Network Working Group. Requests for Comments: 5036. Cisco Systems, Inc. Oct. 2007.
M. Aissaoui et al., Pseudowire (PW) Operations, Administration, and Maintenance (OAM) Message Mapping. Internet Engineering Task Force (IETF). Request for Comments. 6310. CA Technologies. RAD Data Communications. Jul. 2011.
Martini et al.; Pseudowire Setup and Maintenance Using the Label Distribution; Apr. 30, 2006.
International Search Report for PCT/US2013/030221; dated Jun. 25, 2013.

* cited by examiner

*Primary Examiner* — Xavier Szewai Wong
*Assistant Examiner* — Natali N Pascual Peguero
(74) *Attorney, Agent, or Firm* — Kramer Amado P.C.

(57) ABSTRACT

Embodiments of the invention are directed to extended psuedowire groups in a packet switched network. Embodiments associate a pseudowire to one or more groups at each provider edge device across which the pseudowire traverses. When a pseudowire set-up request message traverses across various provider edge devices, each provider edge device typically adds one or more local group membership information elements into the pseudowire set-up request message. In that way the grouping assigned by each provider edge device that the pseudowire traverses is made available to all other provider edge devices traversed by the pseudowire. Advantageously, this availability pseudowire grouping information allows any of these provider edge devices to initiate a wild-card message to notify other provider edge devices with respect to pseudowires in any of its local groups, as well as allowing a pseudowire to be bound to multiple groups based on various requirements.

11 Claims, 8 Drawing Sheets

| 52 | 54 | PW Extended Group TLV 56 | Length 58 |

PW Group Element 1 60a

...

PW Group Element N 60n

| Element Type 102 | Length 104 | Variable Length Value 106a |

Variable Length Value 106m

PSEUDOWIRE EXTENDED GROUP MESSAGING IN A PACKET SWITCHED NETWORK

FIELD OF THE INVENTION

The invention is directed to groups of pseudowires in a packet switched network (PSN), particularly to establishing and managing the groups and conveying information in connection with the groups to devices in the PSN.

BACKGROUND

Pseudowire (PW) is a mechanism that emulates the essential attributes of a telecommunications service (Frame Relay, Asynchronous Transfer Mode, Ethernet) over a Packet Switched Network (PSN). These Layer 2 services can be emulated over an MPLS backbone by encapsulating the layer 2 Protocol Data Units (PDU) and transmitting them with MPLS labels that identifies a PWs. Label Distribution Protocol (LDP) is used as the default protocol for Pseudowire Setup and Maintenance as per Internet Engineering Task Force (IETF) RFC 4447.

The terminology used herein includes PE for "Provider Edge Device" and CE for "Customer Edge Device". A PSN tunnel is established to provide a data path for the PW between two provider edge devices. PW traffic is not distinguishable to the core network, and the core network is transparent to the CEs. Native data units (bits, cells, or packets) arrive via the respective Attachment Circuit (AC) between each PE and its CE, are encapsulated in a PW PDU, and are carried across the underlying network via the PSN tunnel. The PEs perform the necessary encapsulation and decapsulation of PW PDUs and handle any other functions required by the PW service, such as sequencing or timing.

A Multi-Segment Pseudowire (MS-PW) is a set of two or more contiguous PW segments that behave and function as a single point-to-point μW. A MS-PW enables providers to extend the reach of PWs across multiple transport PSN domains. The terminology used herein includes S-PE for "Switching" PE Device where two segments of a MS-PW are stitched together. PW Labels are switched by S-PE between two PW segments.

RFC4447 describes a concept of PW grouping that represents an arbitrary group of PWs specific to a "Terminating" PE (T-PE) device. T-PE stands for the PE device where a PW terminates. When label mapping messages are exchanged between two PW emulation points, those messages carry a PW grouping TLV that identifies a PW group local to the sender T-PE. The T-PE at the other end (receiver of the label mapping) maintains a database of PWs that map to the PW group at sender T-PE.

The PW grouping allows "wildcard" messaging from the sender T-PE on the entire group when any event common to the group requires notifications to the other end T-PE—such as wildcard label withdrawals or wildcard status notification messages. A single message can be sent with the PW grouping identifier (ID) to notify action on all member PWs in a group. For example, a PW grouping ID can be used as a port index and can be assigned to all PWs that have ACs bound to that port. Use of PW grouping ID enables a PE to send one single wildcard label withdrawal message or PW status notification message specifying the group ID in the event of port failure. Such wildcard messaging provides significant reduction of per PW messaging overhead and makes the PW Operations Administration and Maintenance (OAM) Status notifications very efficient.

The existing method of PW grouping imposes the restriction that a PW can belong to only one group across the T-PEs. Further with MS-PW, it is not possible that a PW can belong to the same group across the T-PEs since the MS-PW traverses across one or more S-PEs and such PW grouping is meaningful across a single PW segment.

A set of PWs originating in a first T-PE can be bound to the same local port. It is not necessary that all member PWs are bound to the same PSN tunnel between the first T-PE and a first S-PE since the PSN requirements of the PWs may vary based on diverse Quality of Service (QoS) or diverse next-hop S-PEs requirements, etc. Two PWs of the group may share the same local port but may be routed to different S-PEs. This requires a PW to assign at least two groups at the sender T-PE:

1. An "access" group based on port id or other attributes on the attachment circuit (AC) for triggering a wildcard PW status message on various fault/status transitions associated with the AC.
2. A "network" group based on the PSN tunnel used to reach the first S-PE for triggering wildcard PW status message on various PSN fault/status transitions associated with the PSN tunnel.

The grouping association may also change at each S-PE along the MS-PW. For example, the first S-PE may receive a PW set-up request for both PWs, which have the same grouping ID "G", but may route each of the PWs to different S-PEs or the same S-PE but over different PSN tunnels based on diverse QoS/Policy requirements of each of the PWs. However in both cases, if the first S-PE detects a PSN tunnel fault towards another S-PE, it cannot use wildcard messaging to notify the fault to all PEs of the member PWs that are affected. Further, when an S-PE receives a wildcard message with group G, it cannot transparently forward the wildcard message to next-hop S-PE(s) since grouping ID is meaningful only for a single PW hop.

For efficiency and scalability of PW maintenance, it is required that wildcard messaging be possible from any T-PE or S-PE that can be seamlessly notified across all T-PE or S-PE devices through which the PWs that belong to the group traverse. Hereinafter this document at times may use PE to specify a T-PE or an S-PE. LDP is a Transmission Control Protocol (TCP) based protocol which is prone to signaling delays due to congestion control in TCP. In Dynamic MS-PW, a PW status message traverses through control planes of each of the S-PEs of the MS-PW since that is a requirement of PW OAM Message Mapping, according to IETF RFC6310. Efficiency and performance of PW status signaling is a very important factor for PW OAM Message Mapping, PW Redundancy, PW applications such as Virtual Private Local Area Network Service (VPLS) Media Access Control (MAC) Address Flush for example according to IETF RFC4762. When PW scaling requirements are high (e.g. 128,000 PWs) the resulting high volume of PW status signaling may impact the operational efficiency of LDP and SLA (Service Level Agreement) of the PW service, Therefore, an efficient way of establishing and managing the PW groups and conveying information in connection with the groups to devices in the PSN is desired.

SUMMARY

Embodiments of the invention are directed to extended psuedowire groups in a packet switched network. Some embodiments associate a pseudowire to one or more groups at each provider edge device across which the pseudowire traverses. When a pseudowire set-up request message traverses across various provider edge devices, each provider edge device typically adds one or more local group membership information elements into the pseudowire set-up request message. In that way the grouping assigned by each provider edge device that the pseudowire traverses is made available to all other provider edge devices traversed by the pseudowire. Advantageously, this availability of pseudowire grouping information allows any of these provider edge devices (T-PE or any of the S-PEs) to initiate a wildcard message to notify other provider edge devices with respect to pseudowires in any of its local groups, as well as allowing a pseudowire to be bound to multiple groups based on various requirements. The invention describes this PW grouping as "Extended Groups".

According to an aspect of the invention a method of learning a pseudowire extended group is provided. The method comprises performing the following steps by a provider edge device: receiving a pseudowire setup request message that includes a pseudowire label and extended group information; extracting the extended group information and the pseudowire label from the pseudowire setup request message; adding the extracted extended group information to a database in the provider edge device; and adding the pseudowire label to a record in the database that includes the extracted extended group information.

According to another aspect of the invention a method of initiating a wildcard pseudowire status message is provided. The method comprises performing the following steps on a provider edge device: detecting a change in status of a resource associated with the provider edge device; determining if a pseudowire is affected by the change in status; determining, responsive to a pseudowire being affected by the change in status, a pseudowire group of the pseudowire; forming a wildcard pseudowire status message that includes an indication of the pseudowire group; and forwarding the wildcard pseudowire status message to a next hop of the provider edge device in a path of the pseudowire.

According to yet another aspect of the invention a method of responding to a wildcard pseudowire status message is provided. The method comprises performing the following steps on a provider edge device: receiving a wildcard pseudowire status message over a pseudowire; determining, from the pseudowire status message, an affected pseudowire group; determining an affected pseudowire of the affected pseudowire group; and taking an action with respect to the affected pseudowire.

According to a further aspect of the invention a device for implementing a pseudowire extended group is provided. The device comprises: a data port operable to receive and transmit pseudowire protocol data unit traffic; storage having memory that has been adapted by a program of instructions; and a processor in communication with the storage and the data port. Execution of the program by the processor causes the device to perform a function associated with a pseudowire extended group.

The function performed by the device may include: receiving a pseudowire setup request message that includes a pseudowire label and extended group information; extracting the extended group information and the pseudowire label from the pseudowire setup request message; adding the extracted extended group information to a database in the provider edge device; and adding the pseudowire label to a record in the database that includes the extracted extended group information.

Additionally or alternatively the function performed by the device may further include: detecting a change in status of a resource associated with the provider edge device; determining if a pseudowire is affected by the change in status; determining, responsive to a pseudowire being affected by the change in status, a pseudowire group of the pseudowire; forming a wildcard pseudowire status message that includes an indication of the pseudowire group; and forwarding the wildcard pseudowire status message to a next hop of the provider edge device in a path of the pseudowire.

Further additionally or alternatively the function performed by the device may further include: performing the following steps on a provider edge device: receiving a wildcard pseudowire status message over a pseudowire; determining, from the pseudowire status message, an affected pseudowire group; determining an affected pseudowire of the affected pseudowire group; and taking an action with respect to the affected pseudowire.

According to yet a further aspect of the invention a packet switched network is provided. The packet switched network comprises: a first device for implementing a pseudowire extended group, the first device including a first database; and a second device for implementing a pseudowire extended group, the second device including a second database. The first and second devices have been provisioned to enable communication between them via a pseudowire. The first database includes an identifier of the second device in association with the pseudowire and a second pseudowire group, and the second database includes an identifier of the first device in association with the pseudowire and a first pseudowire group.

BRIEF DESCRIPTION OF THE DRAWINGS

The foregoing and other objects, features and advantages of the invention will be apparent from the following more particular description of the preferred embodiments, as illustrated in the appended drawings, where.

In the figures like features are denoted by like reference characters.

DETAILED DESCRIPTION

Figure 1:
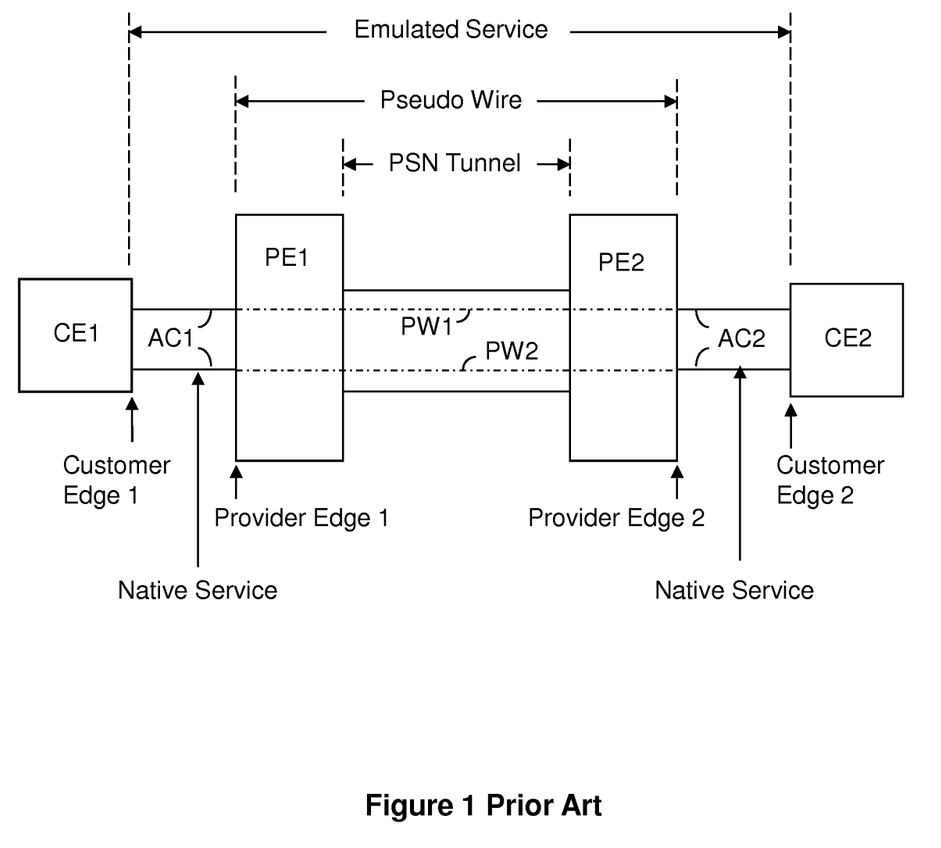
FIG. 1 depicts a prior art PW emulation reference model.

FIG. 1 depicts a prior art PW emulation reference model. As depicted, two PEs (PE1, PE2) provide two PWs (PW1, PW2) on behalf of their client CEs (CE1 and CE2) to enable the client CEs to communicate over a PSN. A PSN tunnel is established to provide a data path for the PWs (PW1, PW2) between the two PEs (PE1, PE2). The PW traffic is indistinguishable from other traffic to the core network, and the core network is transparent to the CEs. Native service data units (e.g. bits, cells, or packets) arrive via the Attachment Circuits (AC1, AC2), are encapsulated in respective pseudowire PDUs (PW PDUs), and are carried across the underlying network via the PSN tunnel. The PEs perform encapsulation and decapsulation of PW PDUs and handle any other functions required by the PW service, such as sequencing or timing.

Figure 2:
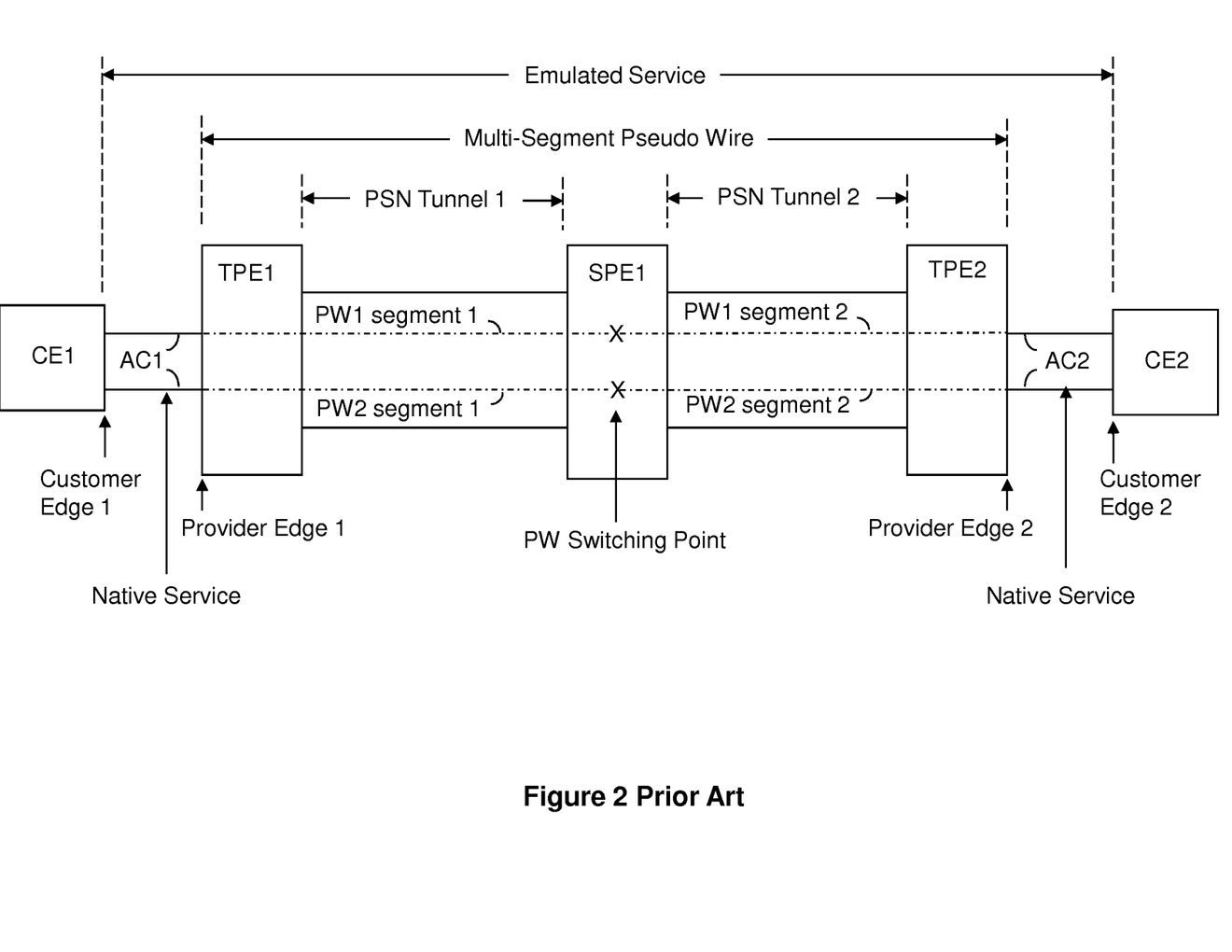
FIG. 2 depicts a prior art reference model for MS-PW.

FIG. 2 depicts a prior art reference model for MS-PW. A Multi-Segment Pseudowire (MS-PW) is a set of two or more contiguous segments that behave and function as a single point-to-point PW. A MS-PW enables providers to extend the reach of PWs across multiple transport PSN domains.

Referring to FIG. 2, a switching point PE (S-PE) (SPE1) runs two separate control planes: one toward a first tunnel endpoint PE (TPE1), and one toward a second tunnel endpoint PE (TPE2). The PW switching point (SPE1) is configured to connect a first segment of a first pseudowire (PW1 Segment 1) carried over a first PSN tunnel (PSN Tunnel 1) and a second segment of the first pseudowire (PW1 Segment 2) carried over a second PSN tunnel (PSN Tunnel 2) together to complete the multi-segment PW between the first and second tunnel endpoint PEs (TPE1, TPE2). The first and second segments of the first pseudowire (PW1 Segment 1, PW1 Segment 2) must be of the same PW type, but the first and second PSN tunnels (PSN Tunnel 1, PSN Tunnel 2) need not be the same technology. In the latter case, if the PW is switched to a different technology, the PEs must adapt the PDU encapsulation between the different PSN technologies. In the case where the first PSN tunnel (PSN Tunnel 1) and the second PSN tunnel (PSN Tunnel 2) are the same technology, the PW PDU does not need to be modified, and PDUs are then switched between the first and second segments of their respective pseudowires at the PW label level.

Figure 3:
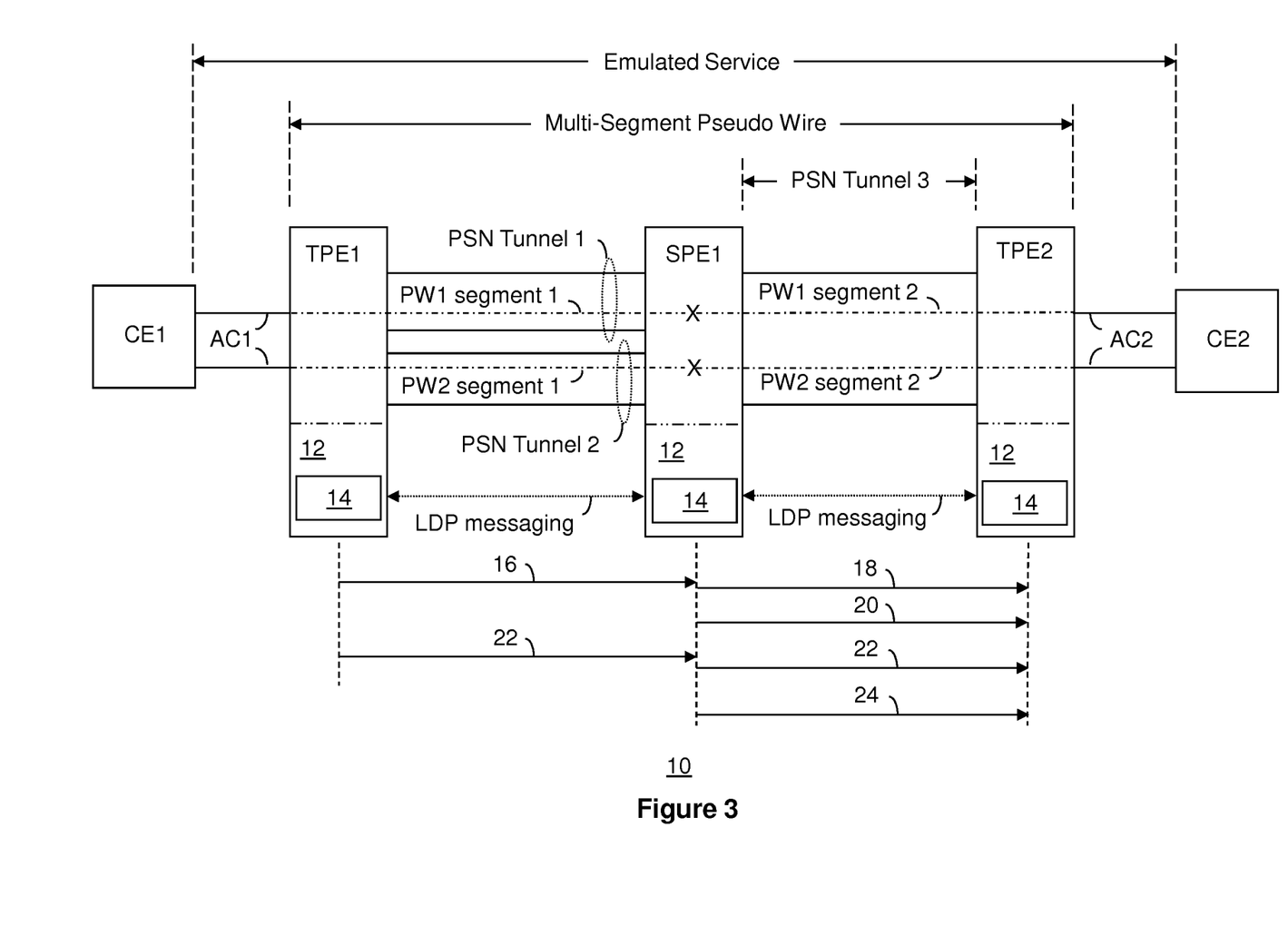
FIG. 3 depicts devices and messaging used to assign and convey PW extended groups for MS-PWs according to a first embodiment of the invention.

FIG. 3 depicts a system 10 capable of assigning a PW extended group for a MS-PW and conveying information about the extended group to all PEs in the path of the MS-PW according to a first embodiment of the invention. The system is similar to that of FIG. 2 with at least one distinguishing feature that the PEs (TPE1, SPE1, TPE2) have been adapted to implement a new concept of PW "extended" groups to enable seamless wildcard messaging across the span of the MS-PW. When a PW is set-up, PW extended group information is carried along with a set-up request message used to set-up the PW. The set-up request message is processed in a control plane 12 of the PEs. Each S-PE along the path of the MS-PW adds the extended group information assigned locally by the S-PE before forwarding the PW set-up request to next-hop PE device. The PW extended group contains multiple PW group elements to which the PW belongs. Each PW group element is described by a PE identifier and group Identifier (PE-ID, Group-ID) tuple. A PE may bind a PW to one or more groups unique to that PE, each such group being represented by a PW group element. Thus a PW group element has local significance to a PE, but the information is propagated to all other PEs along with the path over which the set-up request message of that specific PW travels.

Each PE maintains a mapping 14 of PW group elements that it has learned from it neighboring PE devices. A PE device learns the various PW groups assigned by another PE device from PW extended group information received in a PW set-up request message. Although a PW group is unique to a PE device, each PE device receiving such information maintains the mapping, e.g. as a record in a database on the PE, of PW group elements based on the neighboring PE device from which the PW group elements were learned. This is important since a wildcard message is typically received through a specific neighbor PE device.

A mapping record of a PW group element contains the list of its member PWs. The PW extended grouping allows any PE device to initiate a wildcard message based on one or more local PW group elements. A receiving PE device takes appropriate action on member PWs as per the PW group element mapping record with respect to the sender PE. If the receiving device is an S-PE for a set of PWs that belong to the specified group (or groups) then the wildcard message is seamlessly forwarded to all next-hop S-PE and/or T-PE of the member PWs.

An example is as follows based on the MS-PW shown in FIG. 3.

1. Both the first pseudowire (PW1) and the second pseudowire (PW2) share the same local port and thus are assigned a group (TPE1, G1) in the first tunnel endpoint PE (TPE1).
2. The first and second pseudowires (PW1, PW2) are both routed to the same next-hop, which is the switching point PE (SPE1), but are assigned different transport tunnels, those being the first PSN tunnel (PSN Tunnel 1) and the second PSN tunnel (PSN Tunnel 2), respectively. The first tunnel endpoint PE (TPE1) assigns group G2 to all PWs sharing the first PSN tunnel (PSN Tunnel 1) and G3 to all PWs sharing the second PSN tunnel (PSN Tunnel 2). Thus the first pseudowire (PW1) is assigned the groups (TPE1, G1)+(TPE1, G2) and the second pseudowire (PW2) is assigned the groups (TPE1, G1)+(TPE2, G3).
3. After the switching point PE (SPE1) receives a first PW set-up request message 16 for the first and second pseudowires (PW1, PW2), the switching point PE (SPE1) learns the following PW grouping information and stores it as a mapping 14 of PW group elements:

Neighbor T-PE1:
Port
   (TPE1, G1)→PW1, PW2
Tunnel
   (TPE1, G2)→PW1
   (TPE1, G3)→PW2

4. The switching point PE (SPE1) decides to route both the first and second pseudowires (PW1, PW2) to the same next-hop, which is the second tunnel endpoint PE (TPE2) over the same PSN tunnel, which is a third PSN tunnel (PSN Tunnel 3). The switching point PE (SPE1) assigns the group G1 to all PWs sharing the third PSN tunnel (PSN Tunnel 3). Thus a second set-up request message 18 for the first pseudowire (PW1) is forwarded to the second tunnel endpoint PE (TPE2) with the groups (TPE1, G1)+(TPE1, G2)+(SPE1, G1). A third set-up request message 20 for the second pseudowire (PW2) is forwarded to the second tunnel endpoint PE (TPE2) with the groups (TPE1, G1)+(TPE1, G3)+(SPE1, G1).
5. On receiving the second and third set-up request messages 18, 20 for the first and second pseudowires (PW1, PW2) respectively, the second tunnel endpoint PE (TPE2) forms the following and stores it as a mapping 14 of PW group elements:

Neighbor T-PE1:
Port
   (TPE1, G1)→PW1, PW2
Tunnel
   (TPE1, G2)→PW1
   (TPE1, G3)→PW2
   (SPE1, G1)→PW1, PW2

Based on the PW set-up above some of the PW status/ failure procedures would be as follows.

When local port status changes at the first tunnel endpoint PE (TPE1), the first tunnel endpoint PE (TPE1) initiates a wildcard PW status message 22 with group (TPE1, G1) and sends the message 22 to the switching point PE (SPE1). Upon receiving the message 22, the switching point PE (SPE1) takes action on the first and second pseudowires (PW1, PW2) based on membership information available on the group (TPE1, G1). The switching point PE (SPE1) forwards the wildcard PW status message 22 to the next-hop (or next-hops) of the member PWs, which is the second tunnel endpoint PE (TPE2). Upon receiving the message 22, the second tunnel endpoint PE (TPE2) takes action on the first and second pseudowires (PW1, PW2) based on the membership information it had learned about the group (TPE1, G1). Such actions taken by the switching point PE (SPE1) and the second tunnel endpoint PE (TPE2) may include raising an alarm, diverting traffic carried by the first and second pseudowires (PW1, PW2) to other pseudowires, and/or rerouting the first and second pseudowires (PW1, PW2).

When status of the third PSN tunnel (PSN Tunnel 3) changes at the switching point PE (SPE1), the switching point PE (SPE1) initiates a wildcard PW status message 24 with the group (SPE1, G1) and sends it to the next-hop (or next-hops) of all PWs that share that group, which is the second tunnel endpoint PE (TPE2) in this case. On receiving the wildcard PW status message 24, the second tunnel endpoint PE (TPE2) takes action on the first and second pseudowires (PW1, PW2) based on membership information available in its database 14. Such action taken by the second tunnel endpoint PE (TPE2) may include raising an alarm, diverting traffic carried by the first and second pseudowires (PW1, PW2) to other pseudowires, and/or rerouting the first and second pseudowires (PW1, PW2).

Figure 4:
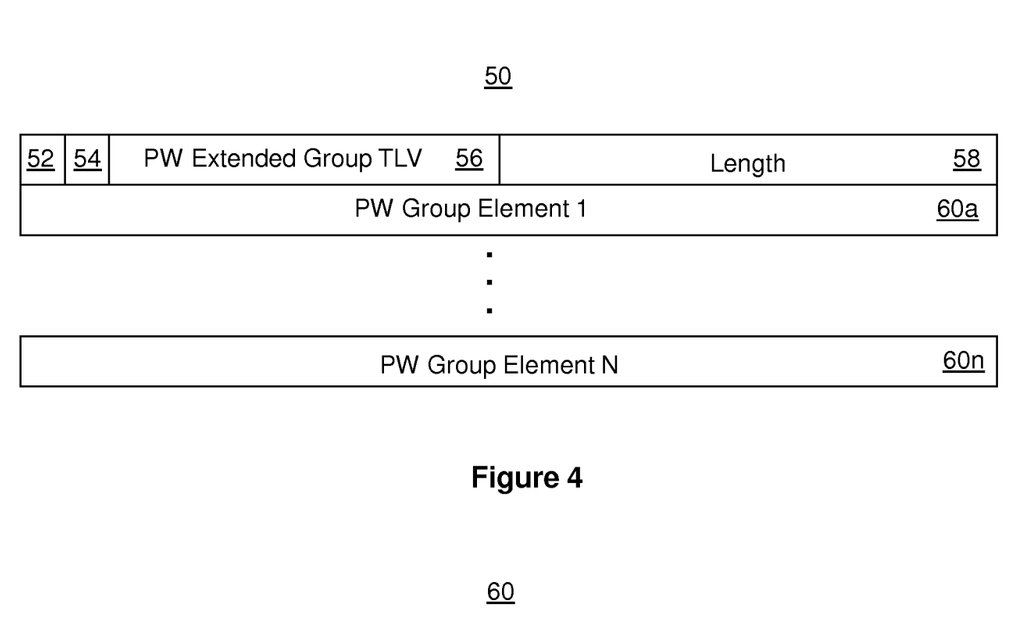
FIG. 4 depicts a PW extended group type length value (TLV) message according to a second embodiment of the invention.

FIG. 4 depicts a PW extended group type length value (TLV) message 50 according to a second embodiment of the invention. A PW extended group TLV 56 occupying bits 2 to 15 in the message 50 carries a list of PW group elements, each PW group element 60a, 60n being a multiple of 32 bits in length. Bits 0 and 1 of the PW extended group TLV message 50 are set to 1 and 0, respectively. Bits 16 to 31 of the PW extended group TLV message 50 hold a length value 58 corresponding to the length of the message 50. The definition of the PW extended group TLV message 50 is compliant with the requirements of IETF LDP specification RFC5036. The LDP specification RFC5036 allows Vendor Private TLV space which can be used to assign the TLV type space assigned to the Vendor. For inter-operability among vendors, the TLV type can also be standardized with the Internet Address and Naming Authority (IANA).

Figure 5:
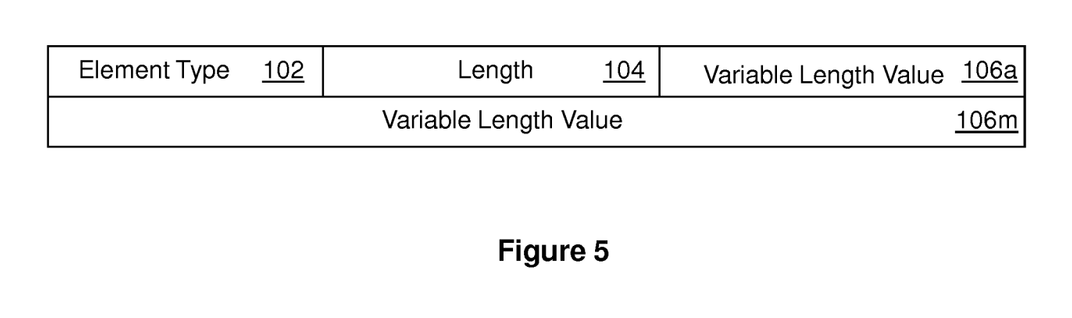
FIG. 5 depicts a PW group element of the message in FIG. 4.

FIG. 5 depicts a PW group element 60 of the PW extended group message 50 in FIG. 4. A PW group element 60 includes an element type field 102 occupying bits 0 to 7, a length field 104 occupying bits 8 to 15 that specifies the length of the PW group element 60, one or more variable length value fields 106a, 106m occupying the remaining bits of the PW group element 60.

The following PW group element Types 102 are defined in this document:
Type 1—Value field 106 contains the following:
  32 bit Group ID.
  IP address identifying the PE device to which the Group ID belongs.
Type 2—Value field 106 contains the following:
  32 bit Group ID.
  Identifier of the PE device in S-PE addressing format as specified in Dynamic Multi-segment PW specification.

Figure 6:
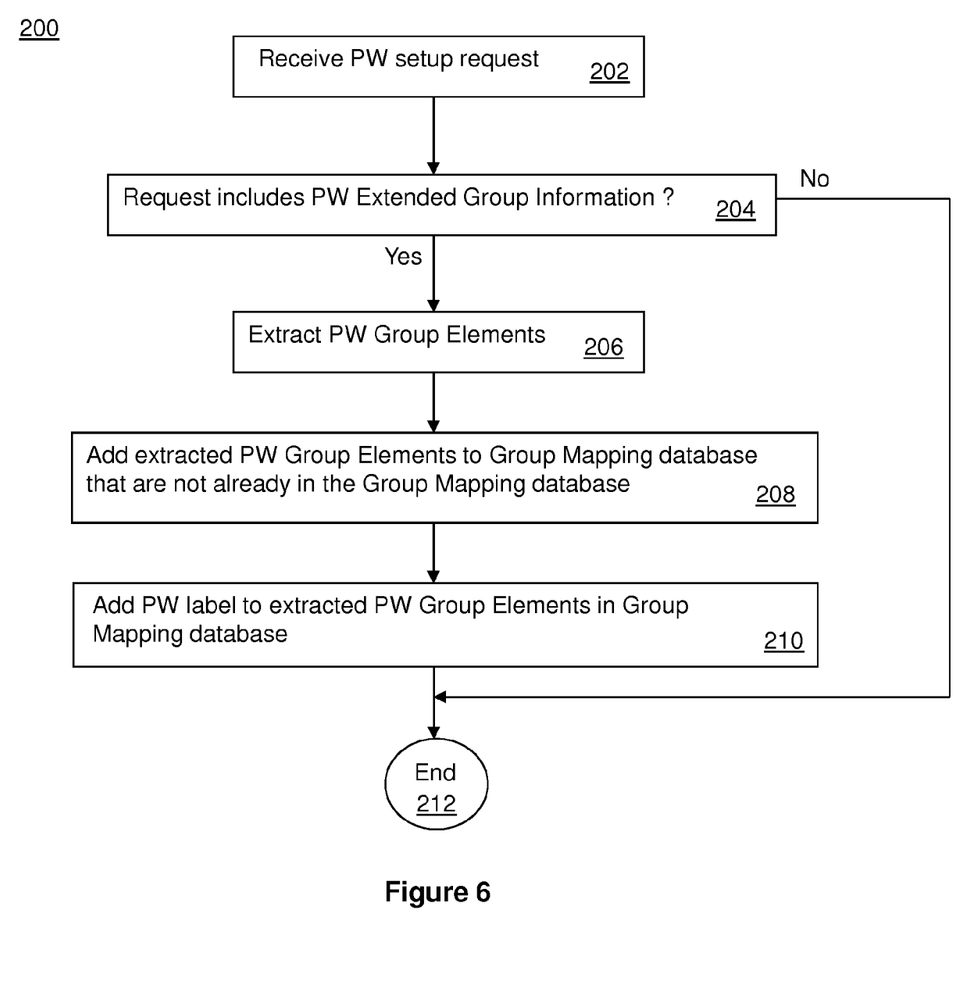
FIG. 6 is a flowchart depicting a method of learning a PW extended group according to a third embodiment of the invention.

FIG. 6 is a flowchart depicting a method 200 of learning an PW extended group according to a third embodiment of the invention. The method 200 may be performed by a PE, which as already stated includes S-PE and TPE devices. The following description of the method 200 references features of the foregoing drawings as examples by the reference characters of the features. The method 200 begins by receiving 202, at a PE (TPE1, SPE1, TPE2), a PW setup request message (16, 18, 20) that identifies a PW to be setup, e.g. by an MPLS PW label. The PE determines 204 whether or not the PW setup request message (16, 18, and 20) includes PW extended group information such as a PW extended group TLV 56. If such PW extended group information is not included in the PW setup request message the method 200 ends 212, otherwise execution of the method 200 proceeds to a step of extracting 206, from the PW setup request message (16, 18, 20) one or more PW group elements 60.

The extracted PW group elements 60 are added 208 to the group mapping database 14 of the PE if they are not already present in the group mapping database 14. This adding 208 could be done in several ways, for example a check could be made first to see if a particular PW group element 60 is already in the group mapping database, e.g. by using the PW group element tuple (PE-ID, group-ID) as an index to search for records in the database already having that tuple, or an attempt to add the PW group element 60 could be made and the actual adding simply skipped if an error was returned indicating that the tuple already exist in the group mapping database 14.

The method 200 then proceeds to adding 210 the PW label of the PW being setup to records in the group mapping database 14 that include the PW group elements extracted from the PW extended TLV 56. The method 200 then ends 212.

Figure 7:
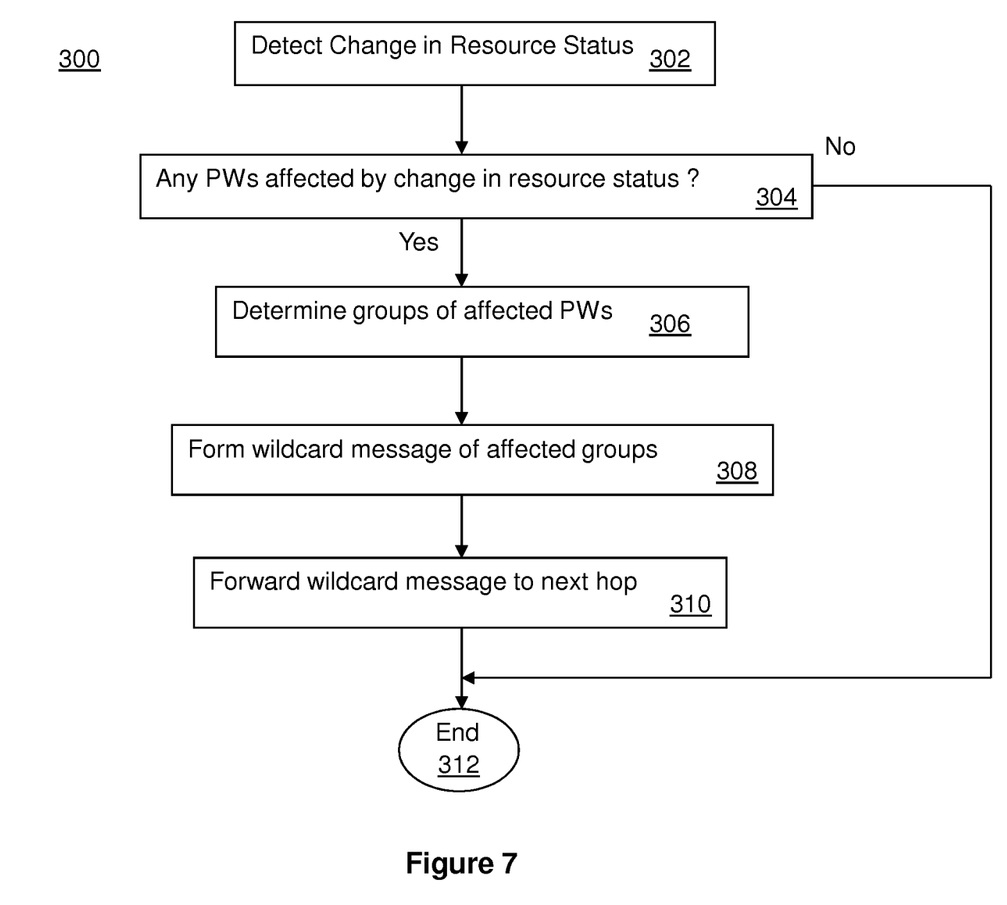
FIG. 7 is a flowchart depicting a method of initiating a wildcard PW status message according to a fourth embodiment of the invention.

FIG. 7 is a flowchart depicting a method 300 of initiating a wildcard PW status message 22 according to a fourth embodiment of the invention. The method 300 may be performed by a PE, which as already stated includes S-PE and TPE devices. The following description of the method 300 references features of the foregoing drawings as examples by the reference characters of the features. The method 300 begins by detecting 302, at a PE, a change in status of a resource associated with the PE. Such resource could be a port of the PE or a PSN tunnel (e.g. PSN Tunnel 1) over which the PE is conveying PW PDUs or otherwise using or monitoring the resource. The change in status may include a change from operational to non-operational status of the resource, a change from alarm-free to alarmed status of the resource, a change from error-free operational to non-error-free operational status of the resource, etc. After a change in status of the resource is detected 302, execution of the method proceeds to a step of determining 304 which PW or PWs, if any, are affected by the change in status. This could be done for example by the PE checking its records of MPLS label provisioning (e.g. as would exist in typical PEs) for PWs that are associated with the resource in question. If no PWs are affected by the change in resource status the method 300 ends 312, otherwise execution of the method 300 proceeds to a step of determining 306 groups of the affected PW or PWs.

Recall that during the method 200 of learning an PW extended group that a PW is associated with includes storing, in a record of the group mapping database 14, the PW label and a PW group element 60. Further recall that a PW group element 60 comprises a tuple that includes a PE-ID and a group-ID. The step of determining 306 groups of one or more affected PWs can be achieved by using the PW label of each affected PW as an index to lookup PW group elements in the PE's group mapping database 14 that correspond to that PW. Execution of the method 300 then proceeds to forming 308 a wildcard message 22 that includes an indication of the affected PW groups. This forming 308 comprises creating a PW extended group TLV 50 that includes the PW group elements 60 of the affected PW groups that were looked up in the PE's group mapping database 14. Execution of the method 300 then proceeds to forwarding 310 that wildcard message 22 to next hop devices in the path of the affected PW or PWs. The method 300 then ends 312.

Figure 8:
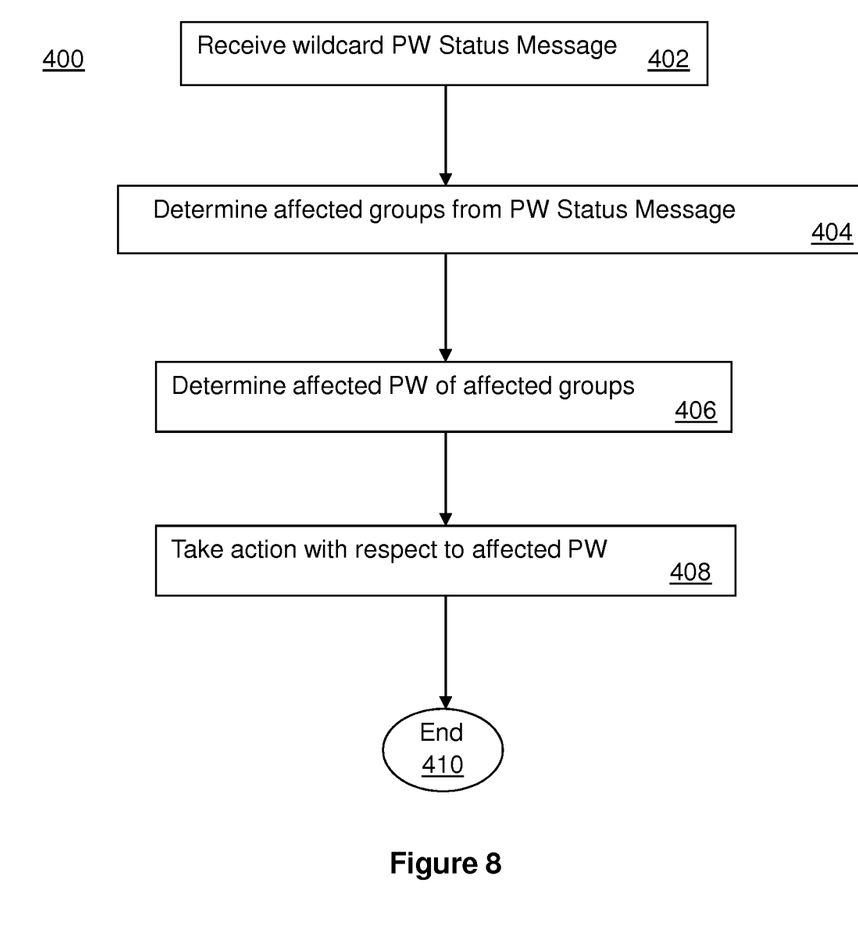
FIG. 8 is a flowchart depicting a method of responding to a wildcard PW status message according to a fifth embodiment of the invention.

FIG. 8 is a flowchart depicting a method 400 of responding to a wildcard PW status message 22 according to a fifth embodiment of the invention. The method 400 may be performed by a PE, which as already stated includes S-PE and TPE devices. The following description of the method 400 references features of the foregoing drawings as examples by the reference characters of the features. The method 400 begins by receiving 402 a wildcard PW status message 22 at a PE over a PW (e.g. PW1). The PE then determines 404 which PW groups are affected from the PW status message 22. This is done by reading the group-ID from the one or more tuples included in the PW group elements 60 of the wildcard PW status message 22. Execution of the method 400 then proceeds to determining 406 affected PW of the affected PW groups. The PE may perform this step for example by using the tuples of the one or more affected group-IDs as an index to read, from the PE's group mapping database 14, the label of each PW associated with the affected PW groups. The method 400 then proceeds to the step of the PE taking 408 an action with respect to the affected PWs. Taking 408 an action may include initiating another wildcard PW status message 22 in accordance with the method 300 previously described, as well it may include raising an alarm, diverting traffic carried by the PW to another PW, and/or rerouting the PW. The method 400 then ends 410.

Figure 9:
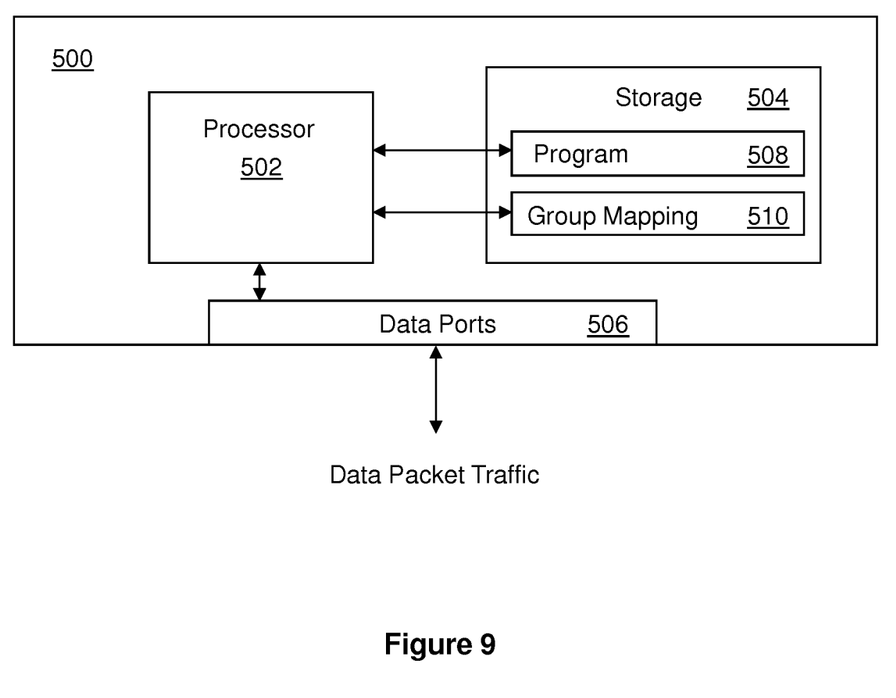
FIG. 9 depicts a device for implementing a pseudowire extended group according to a sixth embodiment of the invention.

FIG. 9 depicts a device 500 for implementing an pseudowire extended group according to a sixth embodiment of the invention. The device may take the form of a PE as previously described. The device 500 includes a processor 502, storage 504, and one or more data ports 506. The processor is in communication with the storage 504 and the data ports 506. The data ports are used to receive and transmit PW PDU traffic of the type previously described, including PW setup request messages (16, 18, 20) and wildcard PW status messages (22, 24). The storage 504 includes memory that stores a program 508 that embodies one or more of the methods 200, 300, 400 previously described. That is, the storage 504 has been configured by the program 508, so that the device 500 is operable to perform one or more of them methods 200, 300, 400. For example, the program 508 would typically include executable instructions that when executed by the processor 500 cause the steps of one or more of the described methods 200, 300, 400 to be performed by the device 500. For that purpose the storage 504 also includes memory 510 that has been adapted to store, and in operation typically stores, information contained in the group mapping database 14 previously described.

Advantageously, PW extended grouping procedures previously described can be applicable for the following scenarios: wildcard withdrawal of PW label mappings, PW status signaling including all OAM message mappings, PW applications as such MAC flush for VPLS, etc.

Numerous modifications, variations and adaptations may be made to the embodiments of the invention described above without departing from the scope of the invention, which is defined in the claims.

What is claimed is:

1. A method of initiating a wildcard pseudowire status message using multiple pseudowire group elements to which a pseudowire belongs, comprising:
    performing the following steps on a provider edge device:
        storing, on the provider edge device, mapping information of pseudowire extended group elements it has learned from neighboring devices through an implementation of a set of two or more contiguous segments that behave and function as a single point-to-point pseudowire;
        detecting a change in status of a resource associated with the provider edge device;
        determining if a pseudowire is affected by the change in status;
        determining, responsive to a pseudowire being affected by the change in status, a pseudowire group of the pseudowire, based on the pseudowire extended group-mapping information;
        forming a wildcard pseudowire status message that includes an indication of the pseudowire extended groups; and
        forwarding the wildcard pseudowire status message to a next hop of the provider edge device in a path of the pseudowire.

2. The method of claim 1, wherein determining if a pseudowire is affected comprises checking, on the provider edge device, for a pseudowire that is associated with the resource.

3. The method of claim 1, wherein determining a pseudowire group comprises reading, from a database on the provider edge device, the indication of the pseudowire group based on the pseudowire.

4. The method of claim 1, wherein forming the indication comprises including a provider edge device identifier and a group identifier in the indication.

5. A device for implementing a pseudowire extended group comprising:
    a data port operable to receive and transmit pseudowire protocol data unit traffic;
    storage having memory that has been adapted by a program of instructions; and
    a processor in communication with the storage and the data port,
    wherein execution of the program by the processor causes the device to:
        store, on the device, mapping information of multiple pseudowire group elements it has learned from neighboring devices through an implementation of a set of two or more contiguous segments that behave and function as a single point-to-point pseudowire;
        detect a change in status of a resource associated with the device;
        determine if a pseudowire is affected by the change in status;
        determine, responsive to a pseudowire being affected by the change in status, a pseudowire group of the pseudowire, based on the pseudowire extended group mapping information;
        form a wildcard pseudowire status message that includes an indication of the pseudowire extended groups; and
        forward the wildcard pseudowire status message to a next hop of the provider edge device in a path of the pseudowire.

6. The device of claim 5, wherein to determine if a pseudowire is affected comprises to check, on the provider edge device, for a pseudowire that is associated with the resource.

7. The device of claim 5, wherein to determine a pseudowire group comprises to read, from a database in the device, the indication of the pseudowire group based on the pseudowire.

8. The device of claim 5, wherein to form the indication comprises to include a provider edge device identifier and a group identifier in the indication.

9. A non-transitory machine-readable storage medium storing instructions, the instructions causing a device to initiate a wildcard pseudowire status message using multiple pseudowire group elements to which a pseudowire belongs, comprising the steps of:

performing the following steps on a provider edge device:
storing, on the provider edge device, mapping information of pseudowire extended group elements it has learned from neighboring devices through an implementation of a set of two or more contiguous segments that behave and function as a single point-to-point pseudowire;
detecting a change in status of a resource associated with the provider edge device;
determining if a pseudowire is affected by the change in status;
determining, responsive to a pseudowire being affected by the change in status, a pseudowire group of the pseudowire, based on the pseudowire extended group-mapping information;
forming a wildcard pseudowire status message that includes an indication of the pseudowire extended groups; and
forwarding the wildcard pseudowire status message to a next hop of the provider edge device in a path of the pseudowire.

10. The non-transitory computer-readable medium of claim 9, wherein determining if a pseudowire is affected comprises checking, on the provider edge device, for a pseudowire that is associated with the resource.

11. The non-transitory computer-readable medium of claim 9, wherein determining a pseudowire group comprises reading, from a database on the provider edge device, the indication of the pseudowire group based on the pseudowire.

* * * * *